United States Patent
Marrero-Fontanez

(10) Patent No.: US 10,340,585 B2
(45) Date of Patent: Jul. 2, 2019

(54) LOW PROFILE WIFI ANTENNA WITH A TOROIDAL PATTERN

(71) Applicant: The United States of America as represented by the Administrator of NASA, Washington, DC (US)

(72) Inventor: Victor J. Marrero-Fontanez, Greenbelt, MD (US)

(73) Assignee: The United States of America as represented by the Administrator of NASA, Washington, DC (US)

(*) Notice: Subject to any disclaimer, the term of this patent is extended or adjusted under 35 U.S.C. 154(b) by 185 days.

(21) Appl. No.: 15/657,590

(22) Filed: Jul. 24, 2017

(65) Prior Publication Data
US 2019/0027806 A1    Jan. 24, 2019

Related U.S. Application Data

(63) Continuation of application No. 15/657,545, filed on Jul. 24, 2017.

(51) Int. Cl.
| | | |
|---|---|---|
| *H01Q 1/28* | (2006.01) | |
| *H04B 7/195* | (2006.01) | |
| *H01Q 5/30* | (2015.01) | |
| *H01Q 1/22* | (2006.01) | |
| *H01Q 1/38* | (2006.01) | |
| *H01Q 7/00* | (2006.01) | |
| *H01Q 9/04* | (2006.01) | |
| *H01Q 19/28* | (2006.01) | |
| *H01Q 5/385* | (2015.01) | |
| *H01Q 1/42* | (2006.01) | |
| *H04W 84/12* | (2009.01) | |
| *H04B 7/185* | (2006.01) | |

(52) U.S. Cl.
CPC ........... *H01Q 1/288* (2013.01); *H01Q 1/2291* (2013.01); *H01Q 1/38* (2013.01); *H01Q 5/30* (2015.01); *H01Q 5/385* (2015.01); *H01Q 7/00* (2013.01); *H01Q 9/0407* (2013.01); *H01Q 19/28* (2013.01); *H04B 7/195* (2013.01); *H01Q 1/42* (2013.01); *H04B 7/18515* (2013.01); *H04W 84/12* (2013.01)

(58) Field of Classification Search
CPC ........ H01Q 1/2291; H01Q 1/27–1/288; H01Q 1/32; H01Q 1/42; H01Q 7/00; H04B 7/1851
USPC ................................ 343/702, 788, 867, 895
See application file for complete search history.

(56) References Cited

U.S. PATENT DOCUMENTS

| | | | |
|---|---|---|---|
| 6,762,655 B2 * | 7/2004 | Wichern ................. | H03H 5/003 333/175 |
| 2005/0088342 A1 * | 4/2005 | Parsche .................... | H01Q 1/38 343/700 MS |
| 2014/0203993 A1 * | 7/2014 | Toyao .................... | H01Q 13/10 343/867 |
| 2014/0240181 A1 * | 8/2014 | Mamuro ................. | H01Q 7/00 343/702 |

* cited by examiner

*Primary Examiner* — Dameon E Levi
*Assistant Examiner* — Hasan Z Islam
(74) *Attorney, Agent, or Firm* — Christopher O. Edwards; Bryan A. Geurts; Mark P. Dvorscak

(57) ABSTRACT

Various embodiments relate to a low-profile, linearly-polarized patch antenna with parasitic elements at 5.3 GHz for the ISS C-band WiFi band. It may also use the 5.8 GHz band. A protective dome helps to meet low earth orbit space requirements.

9 Claims, 5 Drawing Sheets

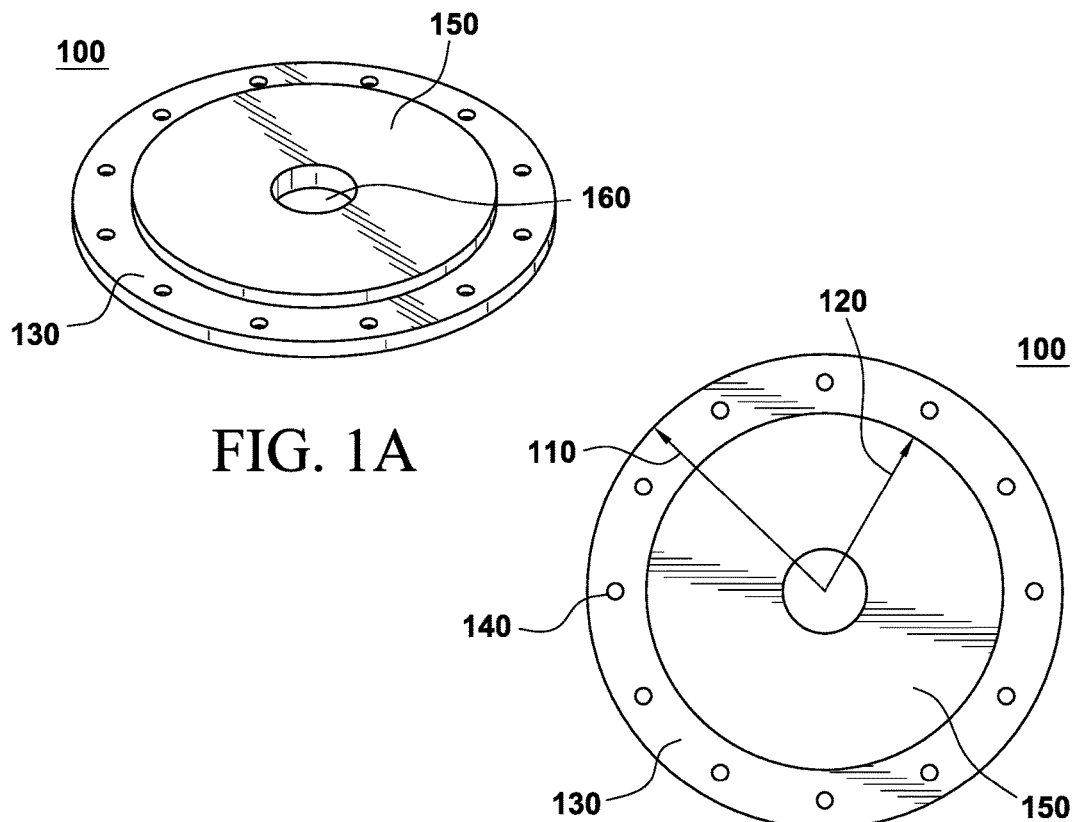
FIG. 1A
FIG. 1B
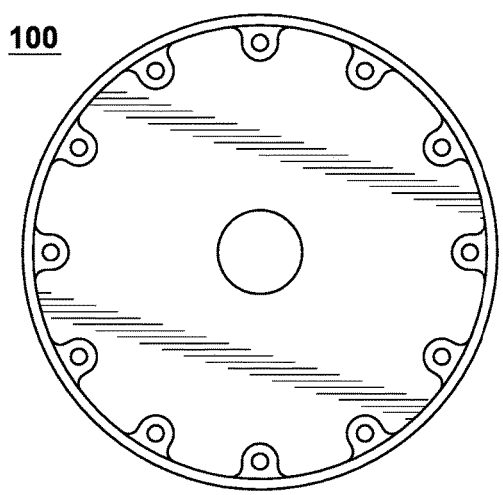
FIG. 1C
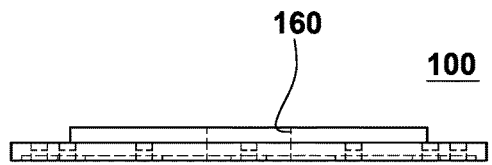
FIG. 1D

LOW PROFILE WIFI ANTENNA WITH A TOROIDAL PATTERN

ORIGIN OF THE INVENTION

This invention described herein was made by an employee of the United States Government, and may be manufactured and used by or for the Government for Government purposes without the payment of any royalties thereon or therefore.

RELATED APPLICATIONS

U.S. patent application entitled "Low Profile WiFi Antenna With a Hemispherical Pattern" Ser. No. 15/657,545, which is hereby incorporated by reference for all purposes as if fully set forth herein.

TECHNICAL FIELD

This disclosure relates generally to a low profile WiFi antenna with a toroidal pattern developed for the International Space Station (ISS), and more specifically, but not exclusively, to a low profile WiFi antenna configured for use in low-Earth orbit.

BACKGROUND

The Robotic Refueling Mission (RRM) is a multi-phased International Space Station (ISS) technology demonstration that is testing tools, technologies, and techniques to refuel and repair satellites in orbit, especially satellites not designed to be serviced.

RRM gives NASA and the emerging commercial satellite servicing industry the confidence to robotically refuel, repair, and maintain satellites in both near and distant orbits well beyond the reach of where humans can go today.

RRM will demonstrate the ability to transfer and freeze a cryogenic fluid and xenon gas in zero-G. RRM consists of the Fluid Transfer Module (FTM) and the Visual Inspection Poseable Invertebrate Robot 2 (VIPIR) instruments. Once the VIPIR tool is mated, it will use wireless (5.3 GHz or 5.8 GHz) to get the HD video from the borescope camera in the tool. The tool is only 18" long, so once mated to the FTM, the separation between the antennas will be between 12" to 18".

SUMMARY OF EXEMPLARY EMBODIMENTS

A brief summary of various embodiments is presented below. These embodiments address the need to provide a durable short-range antenna for the ISS.

In order to overcome shortcomings of the prior art and in light of the present need for a durable antenna for the ISS, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a low-profile WiFi antenna comprising: a first ring of printed circuit board (PCB) dielectric material having an outer radius of no more than 30.18 mm; a second ring of conductive material, located concentrically inside the first ring, having an outer radius of no more than 22.34 mm; a third ring of printed circuit board (PCB) dielectric material, located concentrically inside the second ring, having an outer radius of no more than 17.93 mm; a circular patch of conductive material, located concentrically inside the third ring, wherein a coaxial probe feed is placed substantially at a center of the circular patch; and a protective dome surrounding the first ring and having a height above the first ring, wherein radiation from the low-profile WiFi antenna has a toroidal pattern. The height of the protective dome may be no more than 10 mm.

In various embodiments, the circular patch is configured to be fed 5 mm away from the center of the circular patch.

In various embodiments, the low-profile WiFi antenna is configured to cover a 5.3 GHz frequency band. Alternatively, the low-profile WiFi antenna may be configured to cover both the 5.3 GHz frequency band and a 5.8 GHz frequency band.

In various embodiments, the low-profile WiFi antenna of claim 1, wherein the low-profile WiFi antenna may be configured to be deployed on an International Space Station (ISS). The low-profile WiFi antenna may be configured to be deployed on a Fluid Transfer Module (FTM) of the ISS. In various embodiments, an area of the low-profile WiFi antenna may be no more than 30 $mm^2$.

In various embodiments, a hole is disposed substantially at a center of the circular patch. The hole may have a diameter of substantially 1.27 mm.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features of the present invention are more fully disclosed in the following specification, reference being had to the accompanying drawings, in which:

FIGS. 1A-1D illustrate a WiFi toroidal antenna base plate.

DETAILED DESCRIPTION OF THE INVENTION

Figure 2A:
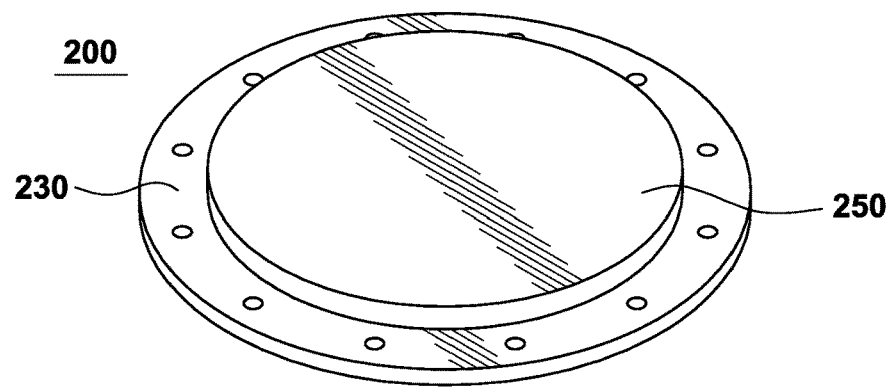
FIGS. 2A-2C illustrate a WiFi antenna dome.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

In light of the need for a short range communication link with a frequency of about 5.3 to 5.8 GHz, embodiments of an antenna to be used in such a communication link will now be described.

The International Space Station (ISS) is maintained in Low Earth Orbit (LEO) with an altitude of between 330 and 435 km. When spacecraft are in LEO, atomic oxygen is a significant problem. Atomic oxygen does not exist naturally for very long on the surface of Earth, because it is very reactive. In space, where there is plenty of ultraviolet radiation, $O_2$ molecules are more easily broken apart to create atomic oxygen. The very thin atmosphere in LEO is comprised of about 96% atomic oxygen. These atoms may collide with objects on the ISS at orbital speeds as high as 7.67 km/s.

Atomic oxygen is highly chemically reactive and erodes material exposed to atomic oxygen in LEO away. A dramatic example of this erosion by atomic oxygen was provided by the Long Duration Exposure Facility (LDEF) launched in 1984. Thus, there is a need to protect communication equipment on the ISS from atomic oxygen.

The Visual Inspection Poseable Invertebrate Robot (VIPIR) is a robotic, multi-capability inspection tool designed to deliver near and midrange inspection capabilities in space. A communication antenna may be deployed on particular locations on the VIPIR. In these locations, the antenna may be exposed to atomic oxygen.

Due to the limited antenna locations on the VIPIR and limited vertical space (height), a dipole-like pattern antenna has been proposed. The receiving end of data transmitted from the VIPIR may be located at the Fluid Transfer Module (FTM). The antenna located at the FTM should be both low cost and low profile. The antenna may target the 5.3 GHz WiFi band, also known as the ISS C-band. It may also be tuned to cover the 5.8 GHz band as well.

The antenna may be a patch antenna excited by parasitic elements. To use this antenna on the ISS, a protective dome may be necessary. A particular dielectric material may be used. The final antenna assembly should meet electrical and mechanical requirements for ISS payloads. As a result, the embodiments described herein may be used on other spacecraft where a short range communication link is needed.

FIGS. 1A-1D illustrate a WiFi toroidal antenna base plate 100. This base plate may be substantially circular in shape. In an exemplary embodiment, it may have an outer radius 110 of substantially 45 mm and an inner radius 120 of substantially 34 mm. A ring 130 located between outer radius 110 and inner radius 120 may have a plurality of holes 140. Each hole 140 may be located at a radius of substantially 40 mm relative to the center of base plate 100, between outer radius 110 and inner radius 120. In an exemplary embodiment, there may be twelve evenly-distributed holes 140 in ring 130. Each hole may have a radius of substantially 1.42 mm.

Base plate 100 may be fabricated from a precipitation-hardened aluminum alloy, such as Al 6061. In particular, Al 6061-T651 may be used, as this alloy is solutionized, stress-relieved stretched, and artificially aged. The selected alloy for base plate 100 may comply with the ASTM B209 Standard Specification. Base plate 100 may further be subjected to chemical conversion coating as a finish. During deployment, base plate 100 may be bolted to a payload. Other materials may be used that satisfy the electrical requirements of the antenna and that can withstand the space environment.

Central torus 150 may be located inside of inner radius 120. Hole 160, surrounded by central torus 150, may be located near the center of base plate 100. Hole 160 may be substantially circular. In an exemplary embodiment, hole 160 may have a diameter of 15.68 mm.

Base plate 100 may have a low profile in the z-axis to reduce damage from high-speed atomic oxygen. Ring 130 between outer radius 110 and inner radius 120 may extend upward by 2.37 mm. Central torus 150 between inner radius 120 and hole 160 may extend upward by 2.97 mm.

Figure 2B:
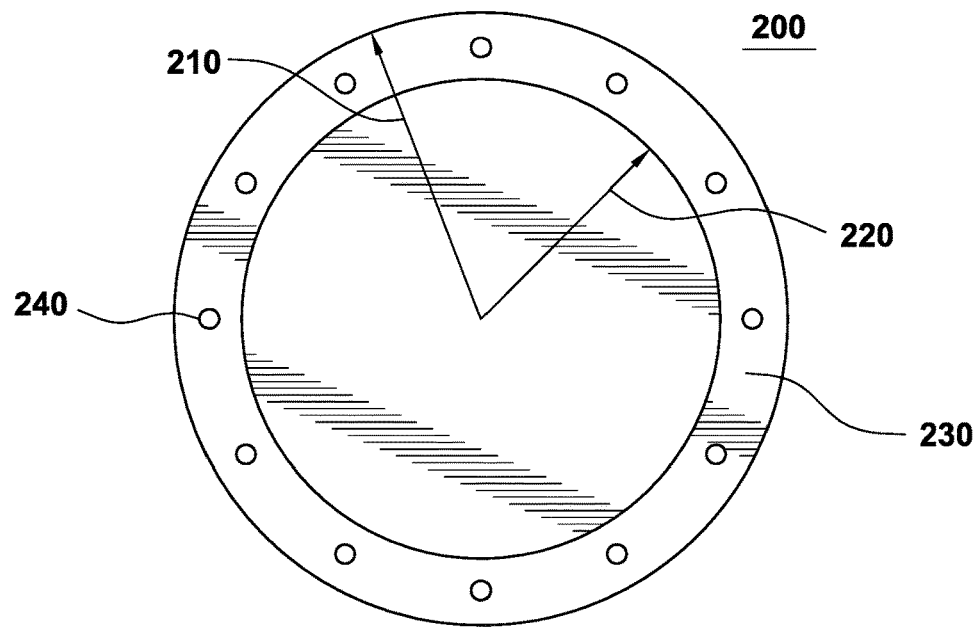
Figure 2C:
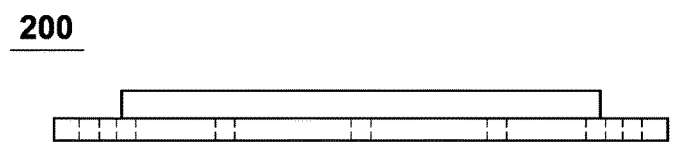
Figure 3A:
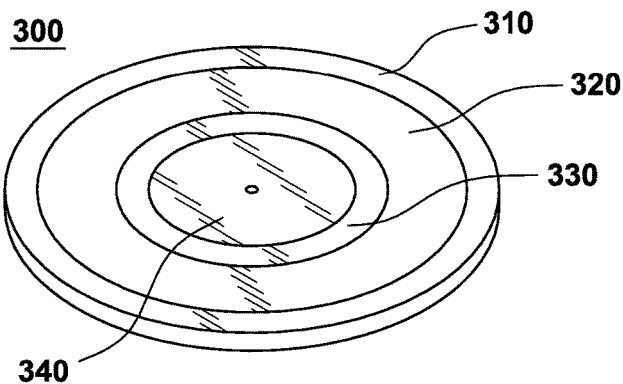
FIGS. 3A-3D illustrate a patch antenna with a concentric ring.
Figure 3B:
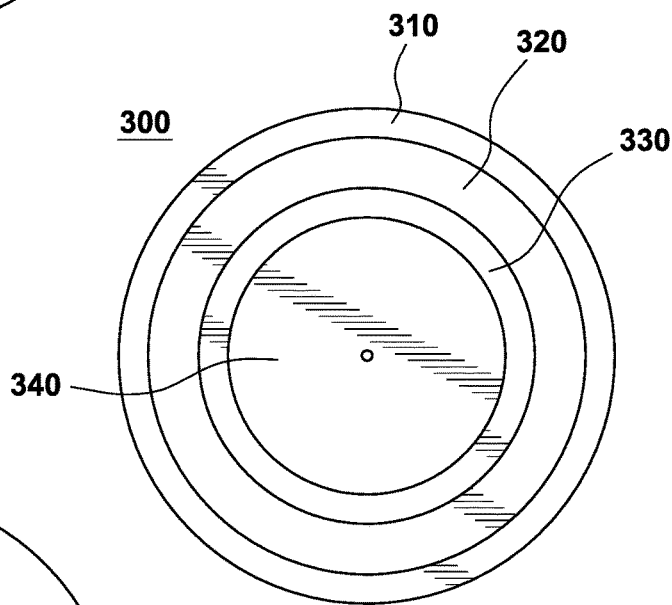
Figure 3C:
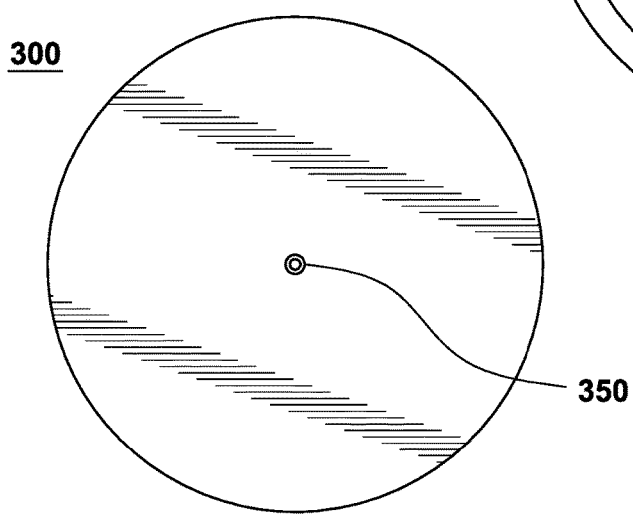
Figure 3D:

FIGS. 2A-2C illustrate a WiFi antenna dome 200. Dome 200 may be configured to fit above antenna base plate 100. Like plate 100, dome 200 may have an outer radius 210 of substantially 45 mm and an inner radius 220 of substantially 34 mm. A ring 230 located between outer radius 210 and inner radius 220 may have a plurality of holes 240. Each hole 240 may be located at a radius of substantially 40 mm. hole 240 may have a radius of substantially 1.42 mm. In an exemplary embodiment, there may be twelve evenly-distributed holes 240 in ring 230. Each hole may have a radius of substantially 1.42 mm, thereby matching the holes in the dome 200 to holes in the base-plate 100. A raised central portion 250 of dome 200 may be located within inner radius 220.

Dome 200 may have a low profile in the z-axis to reduce damage from high-speed atomic oxygen. Ring 230 between outer radius 210 and inner radius 220 may extend upward by 3.05 mm. The total height of the central portion 250 of dome 200 may be 7.08 mm.

Dome 200 may be fabricated from Torlon 5030, a 30% glass-reinforced, polyamide-imide (PAI) resin. Selection of this material may be beneficial because it will not deform as much as other materials. In particular, materials may be selected for their resistance to erosion from atomic oxygen moving at high speeds as well as their strength.

FIGS. 3A-3D illustrate an exemplary WiFi toroidal antenna 300. Antenna 300 may be deployed above base plate 100 and below dome 200. Antenna 300 may be fabricated from a printed circuit board (PCB) material for microwave applications, such as Rogers Duroid™ 6002.

Antenna 300 may have a first ring 310, wherein an outermost radius of first ring 310 is no more than 34 mm. First ring 310 may only have PCB dielectric material. First ring 310 may extend inward to a radius of substantially 30.18 mm.

Antenna 300 may further have a second ring 320 with conductive material. The conductive material may be copper. Second ring 320 may contact first ring 310 and extend inward to a radius of substantially 22.34 mm. Second ring 320 may be formed by depositing the conductive material on the PCB dielectric material.

Antenna 300 may also have a third ring 330 with PCB dielectric material. Third ring 330 is a gap between the conductive ring 320 and patch 340. Third ring 330 may contact second ring 320 and extend inward to a radius of substantially 17.93 mm. Antenna 300 may additionally have a circular patch 340 with conductive material. Circular patch 340 may contact third ring 330 and extend no further than a radius of substantially 17.93 mm. A hole 350 may be disposed substantially at the center of the circular patch 340 of antenna 300. A coaxial probe feed may be placed substantially at a center of circular patch 340. Hole 350 may have a diameter of substantially 1.27 mm. Circular patch 340 may be formed by depositing the conductive material on the PCB dielectric material.

Antenna 300 may have a low, flat profile. Such a profile may reduce exposure to high-speed atomic oxygen, thereby reducing erosion. The thickness of antenna 300 may be no more than 10 mm. In an exemplary embodiment, antenna 300 may have a thickness of 3.05 mm. The area of antenna 300 may be no more than 30 mm$^2$.

Antenna 300 may be plated with gold. In particular, final plating of antenna 300 during fabrication may use electroless nickel immersion gold (ENIG). While antenna 300 may have a thin copper layer, copper corrodes easily. Thus, the copper portion of antenna 300 may be gold-plated prior to launch to avoid corrosion.

The PCB dielectric material may be selected to compensate for wide temperature swings in space applications. Such temperature fluctuations may cause fluctuations in size, "swelling," along the z-axis. Thus, the dielectric material may be very resistant to such swelling.

Figure 4A:
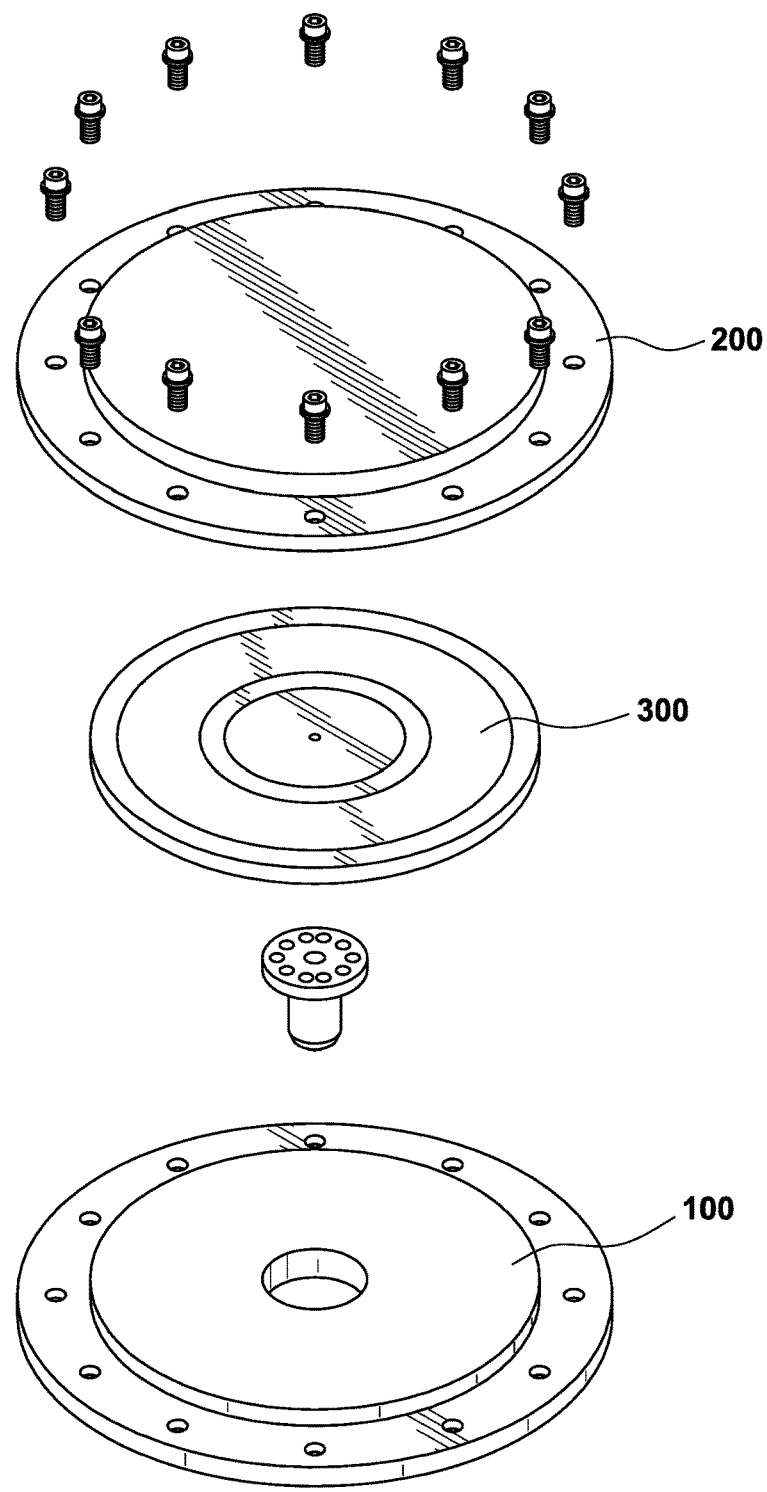
FIGS. 4A and 4B are perspective, expanded views that depict the combination of the base plate, dome, and patch antenna.
Figure 4B:
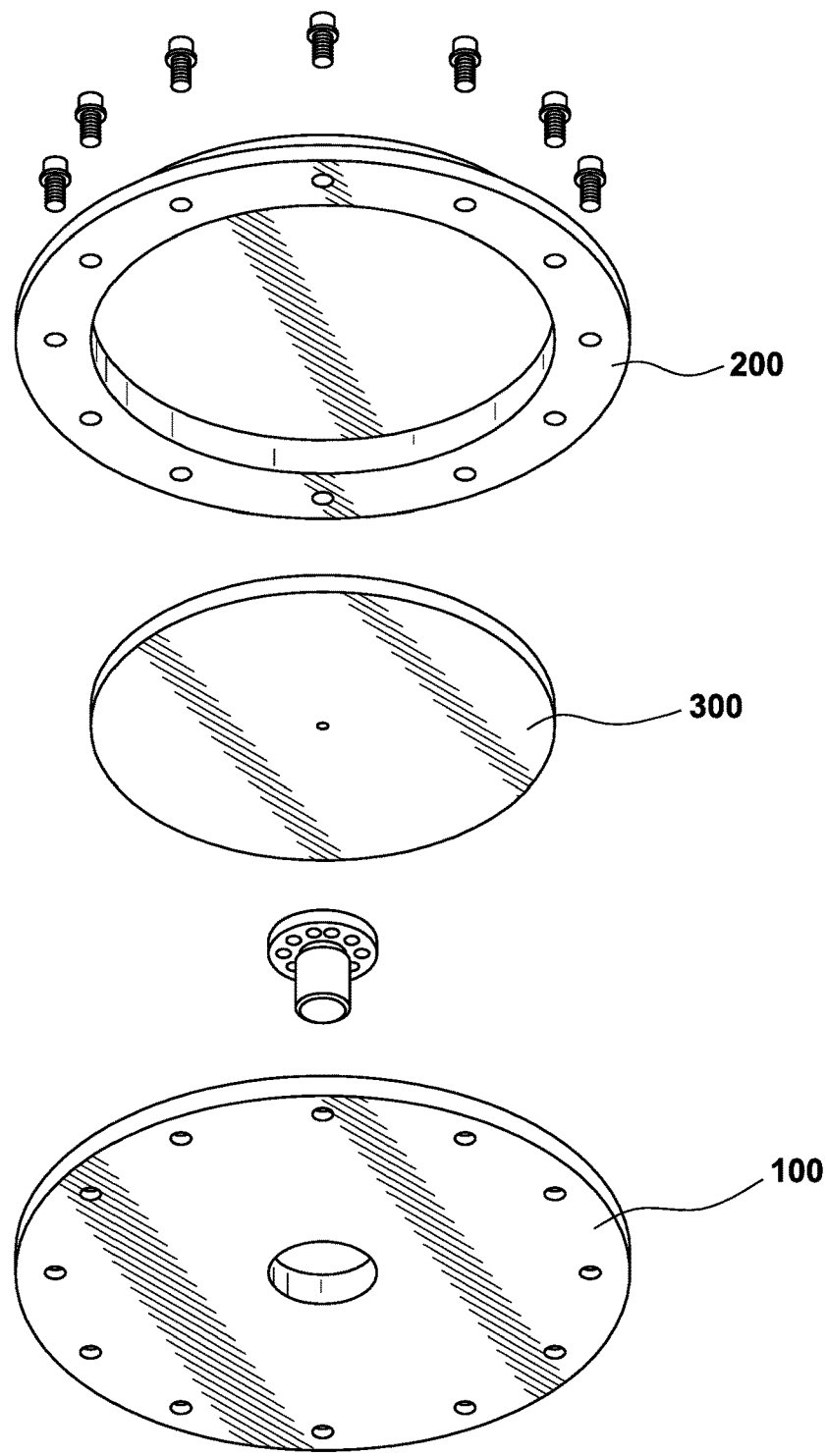

FIGS. 4A and 4B are perspective, expanded views that depict the combination of the base plate 100, dome 200, and patch antenna 300. Antenna 300 is located between dome 200 and base plate 100.

While various materials and dimensions are mentioned above, it is noted that other materials and dimensions may be used. Such materials and dimensions will be selected to achieve certain frequency characteristics of the antenna. Accordingly, be specifying a certain operating frequency of the antenna will result in various specific dimensions based upon the geometry described and the materials to be used.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A low-profile WiFi antenna comprising:
   a first ring of printed circuit board (PCB) dielectric material having an antenna outer radius of no more than 30.18 mm;
   a second ring of conductive material, located concentrically inside the first ring, having an outer radius of no more than 22.34 mm;
   a third ring of printed circuit board (PCB) dielectric material, located concentrically inside the second ring, having an outer radius of no more than 17.93 mm;
   a circular patch of conductive material, located concentrically inside the third ring, wherein a coaxial probe feed is placed substantially at a center of the circular patch; and
   a protective dome surrounding the first ring and having a height above the first ring, wherein radiation from the low-profile WiFi antenna has a toroidal pattern.

2. The low-profile WiFi antenna of claim 1, wherein the height of the protective dome is no more than 10 mm.

3. The low-profile WiFi antenna of claim 1, wherein the circular patch is configured to be fed 5 mm away from the center of the circular patch.

4. The low-profile WiFi antenna of claim 1, wherein the low-profile WiFi antenna is configured to cover a 5.3 GHz frequency band.

5. The low-profile WiFi antenna of claim 4, wherein the low-profile WiFi antenna is configured to cover both the 5.3 GHz frequency band and a 5.8 GHz frequency band.

6. The low-profile WiFi antenna of claim 1, wherein the low-profile WiFi antenna is configured to be deployed on a spacecraft.

7. The low-profile WiFi antenna of claim 1, wherein an area of the low-profile WiFi antenna is no more than 30 mm$^2$.

8. The low-profile WiFi antenna of claim 1, wherein a hole is disposed substantially at a center of the circular patch.

9. The low-profile WiFi antenna of claim 1, wherein the hole has a diameter of substantially 1.27 mm.

* * * * *